US006560981B2

United States Patent
Flynn

(10) Patent No.: US 6,560,981 B2
(45) Date of Patent: May 13, 2003

(54) MIXED REFRIGERANT TEMPERATURE CONTROL USING A PRESSURE REGULATING VALVE

(75) Inventor: Kevin Flynn, Novato, CA (US)

(73) Assignee: IGC-Polycold Systems Inc., Petaluma, CA (US)

(*) Notice: Subject to any disclaimer, the term of this patent is extended or adjusted under 35 U.S.C. 154(b) by 0 days.

(21) Appl. No.: 09/894,964

(22) Filed: Jun. 28, 2001

(65) Prior Publication Data

US 2002/0035841 A1 Mar. 28, 2002

Related U.S. Application Data

(60) Provisional application No. 60/214,565, filed on Jun. 28, 2000.

(51) Int. Cl.[7] .............................. F25B 1/00; F25B 41/04
(52) U.S. Cl. .............................. 62/217; 62/502; 252/67
(58) Field of Search .................... 62/217, 502, 114, 62/222; 252/67

(56) References Cited

U.S. PATENT DOCUMENTS

| 3,768,273 A | * | 10/1973 | Missimer | 62/84 |
| 4,535,597 A | * | 8/1985 | Missimer et al. | 62/55.5 |
| 4,597,267 A | * | 7/1986 | Forrest | 62/55.5 |
| 5,182,920 A | * | 2/1993 | Matsuoka et al. | 62/206 |
| 5,441,658 A | * | 8/1995 | Boyarsky et al. | 252/67 |
| 5,579,654 A | * | 12/1996 | Longsworth et al. | 62/511 |
| 5,702,632 A | * | 12/1997 | Weng | 252/67 |
| 5,715,694 A | * | 2/1998 | Yakumaru et al. | 62/210 |
| 6,076,368 A | * | 6/2000 | Noble | 62/217 |
| 6,167,722 B1 | * | 1/2001 | Kasezawa et al. | 62/513 |
| 6,233,955 B1 | * | 5/2001 | Egara | 62/196.4 |
| 2001/0042379 A1 | * | 11/2001 | Flynn et al. | 62/114 |
| 2002/0023447 A1 | * | 2/2002 | Podtchereniaev et al. | 62/217 |

* cited by examiner

Primary Examiner—Denise L. Esquivel
Assistant Examiner—Marc Norman
(74) Attorney, Agent, or Firm—Katten Muchin Zavis Rosenman

(57) ABSTRACT

A standard refrigeration pressure regulating valve limits the minimum temperature produced by a refrigeration process, which uses a refrigerant mixture including at least two components whose normal boiling points differ by at least 50C. Limiting the lowest temperature prevents freezout of the individual refrigerant.

3 Claims, 1 Drawing Sheet

MIXED REFRIGERANT TEMPERATURE CONTROL USING A PRESSURE REGULATING VALVE

This application claims the benefit of earlier filed and pending provisional application No. 60/214,565 filed on Jun. 28, 2000.

FIELD OF THE INVENTION

This invention is directed at control of the temperature of a refrigeration system where the refrigerant mixture includes components whose normal boiling points vary by at least 50 C from the warmest boiling component to the coldest boiling component. More particularly this invention is intended for use in refrigeration systems where the refrigeration effect takes place at temperatures below −70 C.

BACKGROUND OF THE INVENTION

Refrigeration systems have been in existence since the early 1900s, when reliable sealed refrigeration systems were developed. Since that time, improvements in refrigeration technology have proven their utility in both residential and industrial settings. In particular, very low temperature refrigeration systems, colder than −40 C, currently provide essential industrial functions in biomedical applications, cryoelectronics, coating operations conducted in a vacuum (i.e. physical vapor deposition), and semiconductor manufacturing applications, control of chemical reactions and pharmaceutical manufacturing processes. Another application involves thermal radiation shielding. In this application large panels are cooled to very low temperatures. These cooled panels intercept radiant heat from vacuum chamber surfaces and heaters. This can reduce the heat load on surfaces being cooled to lower temperatures than the panels. Yet another application is the removal of heat from objects being manufactured. In some cases the object is an aluminum disc for a computer hard drive, a silicon wafer for an integrated circuit, or the material for a flat panel display. In these cases the very low temperature provides a means for removing heat from these objects more rapidly than other means, even though the object's final temperature at the end of the process step may be higher than room temperature. Further, some applications involving, hard disc drive media, silicon wafers, or flat panel display material, involve the deposition of material onto these objects. In such cases heat is released from the object as a result of the deposition and this heat must be removed while maintaining the object within prescribed temperatures. Cooling a surface like a platen is the typical means of removing heat from such objects.

This invention relates to refrigeration systems which provide refrigeration at temperatures between −40 C and −220 C by use of a secondary cooling fluid or coolant. The temperatures encompassed in this range are variously referred to as low, ultra low and cryogenic. For purposes of this application the term "very low" or "very low temperature" is used to mean the temperature range of −40 C to −220 C.

A basic requirement of very low temperature refrigeration is that there is no freezout of the individual refrigerant components in the mixture. Refrigerant freezeout will cause blockage of essential refrigerant flow paths in throttle devices and heat exchangers. This leads to a low pressure at the suction side of the compressor and causes the refrigeration process to shut down by virtue of its control circuits. A method of limiting the coldest temperature of a refrigeration process is needed to eliminate refrigerant freezeout.

In many applications, such as the semiconductor device manufacturing industry, it is necessary that refrigeration systems provide very low temperature refrigeration to highly viscous industrial coolants. Highly viscous coolants become very difficult to pump if their temperature becomes too low. Therefore limiting the coldest refrigerant temperature to which the coolant exchanges heat can prevent the coolant from becoming excessively viscous.

Such very low temperatures are needed for a variety of industrial applications. In the semiconductor industry such very low temperatures are important for processing semiconductor wafers. In one such example, the deposition of material on a wafer causes heat to be rejected to the wafer, which heat must be removed. Further, such processes must take place within a specified temperature range. Frequently, the process design requires cooling temperatures of −20 C or colder to achieve desired process conditions. Additionally, very low temperature cooling is needed when the completed wafers are tested.

Traditional refrigeration systems use a device known as a pressure regulating valve that controls the pressure exiting an evaporator. When applied at the outlet of an evaporator it is referred to as a evaporator pressure regulating valve. Such a valve is located downstream of the evaporator. Because conventional refrigeration systems use single component refrigerants, or mixtures of refrigerants consisting of components with normal boiling points within a 30 C span that have been selected to emulate single refrigerants, there is a very close relationship between the evaporating refrigerant pressure and the evaporating refrigerant temperature. Thus, controlling the pressure directly controls the evaporating temperature. On such conventional systems the pressure regulating valve is located at the outlet of the evaporator and is exposed to the evaporator temperature. Since these temperatures are typically −40 C or warmer, there are no significant restrictions in material selection, and elastomers can still be used in the materials of construction.

Providing temperature control for the refrigeration systems discussed in this patent requires special techniques and design considerations. This is because the refrigerant mixtures used for very low temperatures are comprised of components have a wide difference in their normal boiling points. A difference of 120C or more is not uncommon between the normal boiling point of the warmest and coldest boiling point components. For such refrigerant mixtures there is no fixed relationship between evaporating temperature and pressure. With such refrigerants, a range of evaporating temperatures are possible for a given evaporating pressure. In addition, the materials and details of construction do not allow these standard pressure regulating valves to be used at the outlet of a very low temperature evaporator.

BACKGROUND PATENTS

U.S. Pat. No. 5,715,694, "Refrigerator controller," assigned to Matsushita Electric Industrial Co., Ltd. (Osaka, Japan), describes a refrigerator controller that employs a non-azeotropic mixture refrigerant and a compressor, a four-way valve, an outdoor heat exchanger, a fractionator, an overhead condenser provided on the top of the fractionator, a first flow control valve, a throttle, and an indoor heat exchanger which are connected in the form of a ring. The controller further employs a circuit at a lower part of the fractionator returning to the bottom of the fractionator through a second flow control valve and a reheater, and a circuit returning from the overhead condenser to the top of the fractionator, thereby controlling the openings of the first and second flow control valves by the output signal of indoor and outdoor heat exchanger temperature detectors, an indoor temperature detector, and an indoor temperature setting device through a flow controller. In this manner, a wider control range of refrigerating capability can be realized. Thus a high separation effect for mixed refrigerant components is obtained while controlling a safe and optimum refrigerant cycle.

U.S. Pat. No. 6,233,955, "Isothermal coolant circulating apparatus," assigned to SMC Corporation (Tokyo, Japan), describes an energy-saving isothermal coolant circulating apparatus capable of reducing the cost of operation and equipment. A refrigerating circuit section comprises a hot gas circuit for mixing high-temperature refrigerant discharged from a compressor with low-temperature refrigerant being supplied to an evaporator via an electronic expansion valve, and an electronic expansion valve in the hot gas circuit. Coolant returned from a load to a coolant circuit section is cooled in a heat exchanger incorporated by the evaporator thereunto and then mixed with coolant returned from the load in an electric-motor-operated three-way valve to a predetermined temperature. An expansion valve controller in a controlling section controls the electronic expansion valves, while a temperature controller controls the electric-motor-operated three-way valve therein.

U.S. Pat. No. 6,167,722, "Refrigeration unit," assigned to Hitachi, Ltd., (Tokyo, Japan), describes a refrigeration unit using HFC group coolant, having an enhanced cooling capacity so that the performance and the performance coefficient thereof can be enhanced, and the operation thereof can be stably made. The refrigeration unit has a refrigerating cycle with a compressor, a condenser, an expansion valve, and an evaporator. The expansion valve is connected in series in the mentioned order. The unit also comprises HFC group coolant, and a subcooler located between the condenser and the evaporator, wherein the HFC group coolant is turned into liquid coolant in the subcooler, and is then branched into a main liquid stream and a substream which super-cools the main liquid stream through a super-cooling expansion valve, and is led into the intermediate stage part of the compressor.

SUMMARY OF THE INVENTION

The present invention provides the use of a standard evaporator pressure regulating valve in a very low temperature refrigeration system that uses nonstandard refrigerant mixtures. The refrigerant mixtures are comprised of at least two components with normal boiling points that differ by at least 50 C. The use of this standard valve with the nonstandard refrigerant mixture provides control of the coldest temperature of the refrigerant system to keep the temperature from becoming colder than desired.

One advantage of the current invention is that standard refrigeration control valves are used to provide temperature control of a refrigeration system that uses a refrigerant mixture comprised of at least two refrigerants with normal boiling points that differ by at least 50 C.

A second advantage of this invention is that the standard refrigeration control valve does not experience the very low temperatures produced by the refrigeration system.

A third advantage of the invention is that the object being cooled by the refrigeration system is prevented from becoming colder than desired.

A fourth advantage of the invention is that the temperature of the refrigerant mixture is controlled so that none of the individual refrigerants freeze out from the refrigerant mixture.

Still other objects and advantages of the invention will be apparent in the specification.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For better understanding of the invention, reference is had to the following description taken in connection with the accompanying drawing, in which.

DESCRIPTION OF PREFERRED EMBODIMENTS

Figure 1:
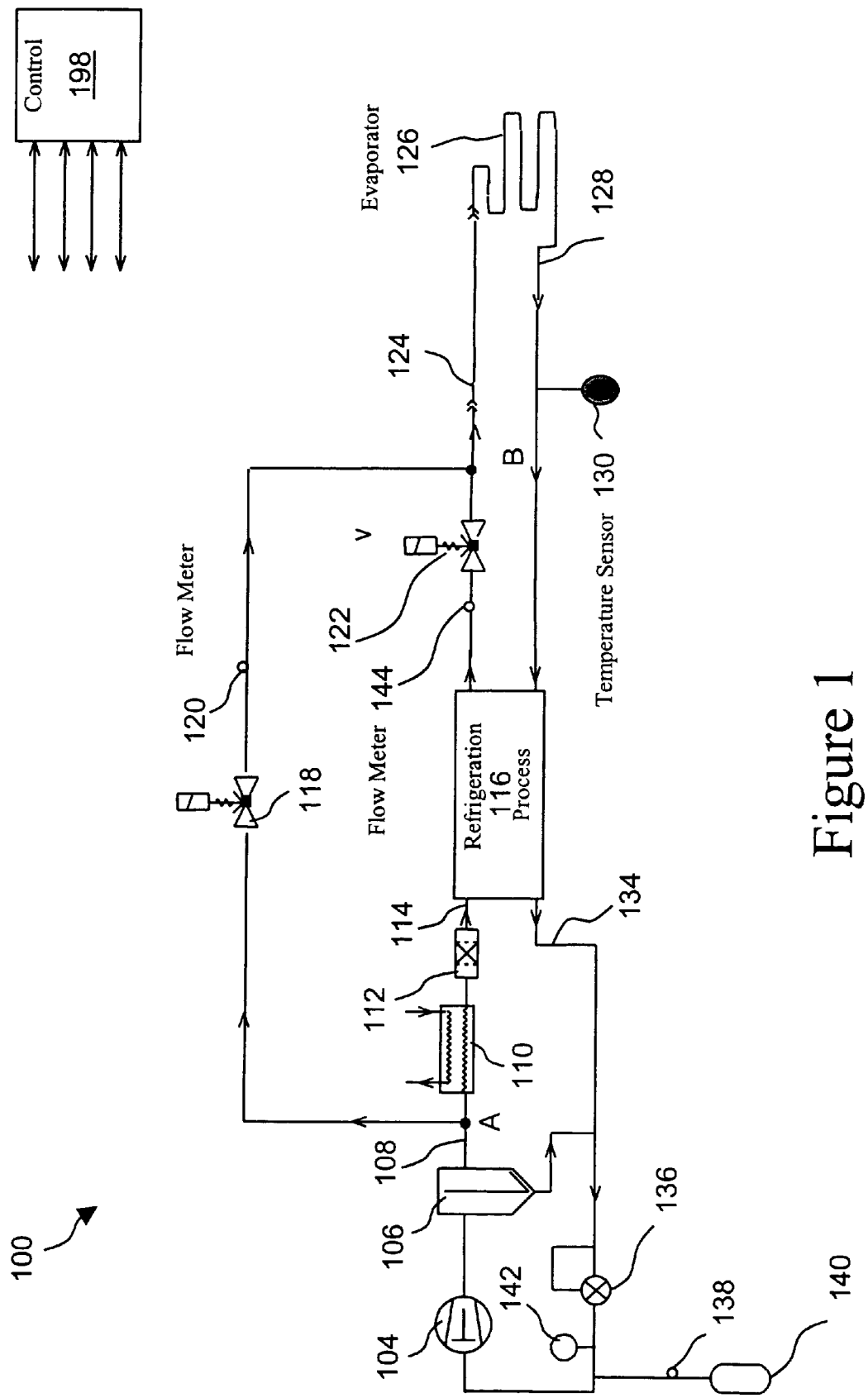
FIG. 1 is a schematic of a very low temperature refrigeration system with an evaporator pressure regulating valve in accordance with the invention.

FIG. 1 is a block diagram of a refrigeration system using an evaporator pressure regulating valve in accordance with the invention. FIG. 1 shows a refrigeration system 100 that includes a compressor unit 104, a refrigeration process 116 feeding an evaporator 126 via a refrigerant supply line 124.

Refrigeration system 100 and its basic operation, which is the removal and relocation of heat, are well known in the art. All components within refrigeration system 100 are connected for refrigerant flow.

In operation of the refrigeration system, hot compressed mixed refrigerant gas exits the compressor and is fed into an optional oil separator 106. Gas exits the oil separator through discharge line 108 which has a branch at node A. The main branch of discharge line 108 feeds a condenser 110, which is cooled by air or water. Refrigerant exits the condenser 110 in a partially condensed (i.e. liquid plus vapor) state at a temperature close to ambient. The refrigerant exits the condenser and passes through a filter drier 112, which adsorbs any excess water and acid, and is fed into the high pressure side of the refrigeration process 116. The high pressure exit from refrigeration process 116 is refrigerant gas that is mainly liquefied and at a very low temperature. The refrigerant feeds flow metering device (FMD) 144, which throttles the refrigerant to low pressure and creates an additional refrigeration effect thereby lowering the temperature of the refrigerant as it passes through FMD 144. The flow exiting FMD 144 feeds a solenoid valve 122 which feeds refrigerant feed line 124 which in turn feeds an evaporator 126 where heat is absorbed by the refrigerant from the process (thermal load) requiring heat removal. The refrigerant flow path is completed by return line 128 which feeds into the low pressure side of refrigeration process 116.

Low pressure refrigerant entering refrigeration process 116 enters at very low temperature. The low pressure refrigerant exiting refrigeration process 116 is at a higher temperature of −40 C or warmer and is mixed with oil returning from oil separator 106. Low pressure refrigerant then flows through a standard evaporator pressure regulating valve (EPR) valve 136 and then is returned to the compressor 104. Refrigerant enters the compressor at low pressure and at a temperature warmer than −40 C.

Some refrigeration systems require the ability to perform a rapid warm up, or defrost, of the evaporator. In this situation, the additional flow path between nodes A and B is utilized. This path allows hot refrigerant to bypass the water cooled condenser 110 and the refrigeration process 116 and flow to the evaporator 126 thereby warming it. The returning defrost flow is returned to the low pressure side of refrigeration process 116. The flow of defrost gas to the evaporator 126 is controlled by solenoid valve 118 and optional FMD 120. In alternative arrangements the retuning hot gas from the evaporator 126 bypasses the refrigeration process 116 and is returned to the compressor 104. Many variations of these arrangements are possible and are disclosed in patent application Ser. No. 09/870,385, incorporated herein by reference.

Control of the defrost process is governed by control circuit 198. An input to the control circuit 198 is temperature sensor 130 which senses the refrigerant temperature in return line 128. Additionally, the refrigeration process has expansion tank 140, which provides for expansion of very low temperature refrigerant gas mixture when the refrigeration process is turned off and the refrigerant warmed to room temperature. Flow to and from expansion tank 140 is regulated by flow meter device 138.

When cool feed valve 122 is closed there must be at least one internal flow meter device (not shown) providing a return path from the high pressure side to the low pressure side in refrigeration process 116. This is needed to provide continuous operation since the continued operation of the compressor relies on having heat removed from the refrigerant mixture by the condenser 110. Further, an internal bypass within refrigeration process 116 when valve 122 is closed keeps the refrigeration process at very low temperatures and ready to provide cooling once valve 122 is opened.

Typically service valves (not shown for clarity) are used in the system to permit isolation and servicing of discrete portions of the refrigeration system.

Refrigeration process 116 is any refrigeration system or process, using a mixed-refrigerant comprising at least two components with normal boiling points that differ by at least 50 C. The mixed refrigerant is used in an individual stage of a cascade refrigeration processes, an auto-refrigerating cascade cycle, or a Kleemenko cycle.

More specifically, refrigeration process 116 may be the IGC Polycold Systems Inc. (San Rafael, Calif.) system (i.e., autorefrigerating cascade process), IGC APD Cryogenics (Allentown, Pa.) system with single expansion device (i.e., single stage cryocooler having no phase separation, Longsworth U.S. Pat. No. 5,441,658), Missimer type cycle (i.e., autorefrigerating cascade, Missimer U.S. Pat. No. 3,768, 273), Kleemenko type (i.e., two phase separator system), or systems with a single phase separator. Also, refrigeration process 116 may be variations on these processes such as described in Forrest U.S. Pat. Nos. 4,597,267 and Missimer 4,535,597.

Several additional basic variations of refrigeration system 100 shown in FIG. 1 are possible. Refrigeration process 116 may be one stage of a cascaded system, wherein condensation of refrigerant is caused by very low temperature refrigerant from another stage of refrigeration. Similarly, the refrigeration produced by the refrigeration process 116 may be used to cool and liquefy refrigerant of a lower temperature cascade process. Further, the refrigeration process 116 shown in FIG. 1 uses at least a single compressor. It is recognized that the refrigerant vapor compression effect can be obtained using two or more compressors in parallel, or that the compression process may be broken up into stages via compressors in series or a two or multi-stage compressor. All of these possible variations are considered to be within the scope of this disclosure.

FIG. 1 associates with a single evaporator. In principle this refrigeration system can be modified to cool and defrost multiple evaporators in parallel. Each independently controlled evaporator requires the necessary controls and valving to control refrigerant flow. In the case of systems providing both cooling an defrost, each independent evaporator will typically have its own solenoid valve and flow metering device to control the flow of cold refrigerant and defrost refrigerant.

The EPR valve 136 is any of the standard refrigeration evaporator pressure regulating valves that open on rise of valve inlet temperature (pressure). Examples are the ORIT-6 and ORIT-10 EPR valves sold by the Sporlan Valve Company (Washington, Mo.). The valve's function is well described by Sporlan's product literature. Also, any pressure regulating valve that opens when the inlet pressure rises above a preset value (and thereby lowers the inlet pressure) can be used for the control purpose described in this invention. In the preferred embodiment, the EPR valve 136 is adjustable and has a pressure port at the inlet so that its function can be verified.

The selection of the valve needs to be appropriate for the amount of refrigerant flowing through the valve at the various operating conditions that the system is designed for. Extensive sizing tables relating to valve pressure drop are provided by the manufacturers. However, these tables are given in terms of standard refrigeration capacity ratings when using standard refrigerants. Thus, it is necessary to "back calculate" the actual mass flow rates using standard refrigerants. These standard refrigerants must be compared to the molecular weight and flow rate of the mixed refrigerant flowing through refrigeration system 100 at its various design conditions. Those skilled in the art will understand how to make interpolations of the back calculations from the vendor tables to estimate pressure drop in the EPR when using the mixed refrigerants, and how to assess what level of valve pressure drop is acceptable and appropriate in the design of the system.

The EPR valve 136 limits the minimum system pressure experienced on the low pressure side of the refrigeration process 116. In the simplest version, refrigeration process 116 comprises a counterflow heat exchanger with high pressure refrigerant transferring heat to low pressure refrigerant.

Control of the low pressure side of refrigeration process 116 has a double effect. First, it affects the evaporating temperatures on the low pressure side of refrigeration process 116 and the evaporating pressure of the evaporator. Second, a low pressure side response then affects the temperatures achieved on the high pressure side of refrigeration process 116 since the high pressure refrigerant is in heat exchange with the low pressure refrigerant. The end result is to limit the minimum temperature produced by the refrigeration system. Minimum temperature can be very important to prevent freezeout of the individual mixed refrigerant components. In addition, pressure control on the low side can be used to keep the evaporator refrigerant from becoming colder than desired. Temperature control is important when the evaporator is cooling highly viscous liquids that become difficult to pump when they become too cold (and too viscous). Likewise, any object being cooled will benefit from this control method if limiting the minimum temperature is desired.

The minimum temperature of the very low temperature process is not determined solely by the operating pressures and the refrigerant composition. It is also affected by the total thermal energy, or total load, cooled by the evaporator. When this load becomes very small, or close to zero, the refrigeration system will reach its lowest temperatures. This condition then corresponds to lower operating pressures on the low side and the high side, unless controls are in place to limit these operating pressures. This is due to a feedback process of these very low temperature refrigeration systems. As the evaporator load is reduced, the total heat exchanged by the heat exchanger(s) of refrigeration process 116 is reduced, which in turn results in a lower temperature difference between the two streams, which results in colder temperatures for the high pressure side which cools the evaporator further, which then provides colder refrigerant back to refrigeration process 116, and so on.

In other, arrangements, refrigeration process 116 contains internal FMDs that serve to at least partially bypass the evaporator and return flow from the high pressure side to the low pressure side. This allows the refrigeration process to continue to operate even when the refrigeration system 100 is not providing cooling at the evaporator 126 (i.e., whenever valve 122 is closed). In such a condition, the thermal load due to the evaporator is indeed zero and the only external thermal load is due to heat leaks through the systems insulation (not shown). The continued operation of refrigeration process 116 with no flow returning from the evaporator also causes the lowest temperatures of the refrigeration process 116. In this case freezeout of refrigerant components will occur depending on the temperatures achieved and the refrigerant components in the mixed refrigerant.

Use of the EPR valve 136 will maintain the pressure of the low pressure side of the refrigeration process 116 at a minimum pressure. This pressure in turn imposes a limit on the minimum temperature produced by the refrigeration process 116 whether or not valve 122 is open, and will set the limit on the minimum temperature produced in refrigeration process 116, and will in turn cause a limit on the refrigerant temperature at the evaporator 126 when valve 122 is open. Those skilled in the art can determine the setting required on the EPR valve 136 empirically, or by calculations of the system design.

In a second embodiment, in accordance with the invention, the evaporator described in the first embodiment is operated with a mixed refrigerant including individual refrigerant components with boiling points that vary by at least 50 C from the coldest boiling component to the warmest boiling component in the mixture.

A list of refrigerants that can be mixed together to provide the required refrigeration performance are listed in Table 1.

TABLE 1

| Refrigerant composition | | |
|---|---|---|
| Ingredient Name | Range (% by weight) | Example (% by weight) |
| Argon or Nitrogen | 0–20% | |
| R-14 | 10–60% | R-14  22% |
| At least one of R-23, or ethane | 5–40% | R-23  9% |
| At least one of R-125, or R-143a, or R-32, or R-134a, or R-227ea, or R-218, or R-152a | 5–30% | R-125  9% |
| At least one of | 0–70% | R-236fa  60% |

TABLE 1-continued

| Refrigerant composition | | |
|---|---|---|
| Ingredient Name | Range (% by weight) | Example (% by weight) |
| R-236fa, or R-245fa, or R-236ea or R-245ca, or E-347, or R-4112, or R-4310meec | | |

Table 1 is a listing of the refrigerant mixture used in conjunction with the present invention, including Argon or Nitrogen, along with refrigerants R-14, R-23, R-125, R-32, R-134a, R-227ea, R-218, R-152a, R-236fa, R-245fa, R-245ca, R-236ea. With the exception of E-347, R-4112, and R-4310meec, all refrigerants listed are designated in accordance with American Society of Heating and Refrigeration and Air Conditioning Engineering (ASHRAE) standard number 34.

E-347 is also known as 1-(methoxy)-1,1,2,2,3,3,3-heptafluoropropane (also $CH_3—O—CF_2—CF_2—CF_3$), 3 M product reference Hydrofluoroether 301.

R-4112 is known as dodecafluoropentane (also $CF_3CF_2CF_2CF_2CF_3$).

R-4310meec (1,1,1,2,2,3,4,5,5,5-decafluoropentane) is commercialized as a solvent by DuPont and is known by the trade name Vertrel XF.

For most applications it is desired to have refrigerant components that are nonflammable and nontoxic. The specific example shown in Table 1 meets these criteria and is a preferred refrigerant combination to use. This blend was applied in a refrigeration system without any phase separation, as described by Longsworth, cited above.

The other refrigerant listed are alternative refrigerants. Refrigerant R-245fa is a refrigerant for use with or instead of R-236fa. Likewise, R-236ea and R-245ca are good candidates for use with or instead of R-236fa should they be available.

Refrigerant E-347 is also another good refrigerant for use with or instead of R-236fa. However, a permissible exposure limit for E-347 is not yet established. Once known its exposure limits will need to be reviewed for customer acceptance.

The following refrigerants are known to be flammable which makes them less desireable for use: R-32, R-143a, R-152a, ethane.

Refrigerants R-227ea and R-134a are not optimal refrigerants for most very low temperature applications because their boiling point is not optimum. Instead, R-125 is preferred.

Refrigerants R-218 and R-4112 are fully fluorinated compounds and have high global warming potentials. Therefore they are also not preferred. Additionally they are expected to produce a lower refrigeration efficiency than the preferred refrigerants.

R-4310meec is considered to be toxic which makes it a less desirable refrigerant than the preferred refrigerants.

In summary, the invention uses a standard refrigeration pressure regulating valve to limit the minimum temperature produced by a refrigeration process, which uses a refrigerant mixture comprised of at least two components whose normal boiling points differ by at least 50 C. Limiting the lowest temperature prevents freezeout of the individual refrigerant components and prevents the object being refrigerated from becoming colder than desired. A listing of specific refrigerant mixtures is provided.

What is claimed is:

1. A very low temperature closed cycle refrigeration system comprising:

a mixed refrigerant comprising at least two components with normal boiling points that differ by at least 50 C;

a compressor unit with an outlet delivering a refrigerant flow at high pressure and an inlet receiving said refrigerant flow at low pressure:

an evaporator receiving said refrigerant flow from said compressor unit at low pressure and low temperature and returning said refrigerant flow to said compressor inlet;

a condenser unit receiving said high pressure refrigerant flow from said compressor and removing heat therefrom;

a flow metering device between said condenser unit and said evaporator to reduce said high pressure from said compressor to said low pressure in said evaporator and to lower the temperature of said refrigerant flow;

heat transfer means for receiving a flow of compressed refrigerant from the compressor, removing heat from the high pressure refrigerant by transferring at least a portion of the heat to a flow of low pressure refrigerant from the evaporator;

a control valve receiving said low pressure refrigerant flow from said heat transfer means and outputting said refrigerant flow to said compressor inlet, said control valve maintaining a selected level of said low pressure at an inlet of said control valve and controlling said evaporator pressure.

2. A system as in claim 1, wherein said refrigerant is a mixed refrigerant and is composed of the following:

| Ingredient Name | Range (% by weight) |
| --- | --- |
| Argon or Nitrogen | 0–20% |
| R-14 | 10–60% |
| At least one of R-23, or ethane | 5–40% |
| At least one of R-125, or R-143a, or R-32, or R-134a, or R-227ea, or R-218, or R-152a | 5–30% |
| At least one of R-236fa, or R-245fa, or R-236ea or R-245ca, or E-347, or R-4112, or R-4310meec. | 0–70% |

3. Refrigeration system as in claim 1, wherein said refrigerant is a mixed refrigerant and includes by weight 22% of R-14; 9% of R-23; 9% of R-125 and 60% of R-236$_{fa}$.

* * * * *